United States Patent Office 2,727,874
Patented Dec. 20, 1955

2,727,874

ACCELERATION OF THE REACTION BETWEEN BUTYL RUBBER AND DIMETHYLOL PHENOLS BY MEANS OF CHLORINATED PARAFFIN WAX AND PRODUCT OBTAINED THEREBY

Lester C. Peterson and Harvey J. Batts, Indianapolis, Ind., assignors to United States Rubber Company, New York, N. Y., a corporation of New Jersey No Drawing. Application December 31, 1952, Serial No. 329,127

17 Claims. (Cl. 260—28.5)

This invention relates to a process for chemically modifying Butyl rubber, and more particularly it relates to a process for accelerating the reaction between Butyl rubber and dimethylol phenols, as well as to improved products obtained thereby.

A copending application of Tawney and Little, Serial No. 266,146, filed January 12, 1952, now U. S. Patent 2,701,895, discloses and claims the vulcanization of Butyl rubber with dimethylol phenols. It has been desired to render the vulcanization of Butyl rubber with dimethylol phenols more convenient and more economical, by reducing the time and temperature necessary to attain a practical cure by this method. Accordingly, the principal object of the present invention is to provide a method of accelerating the aforesaid vulcanization process.

We have now discovered that the cure of Butyl rubber with dimethylol phenols is greatly accelerated in the presence of a small amount of chlorinated paraffin wax, and excellent cures can be obtained in a considerably shorter time, or at a lower temperature, than would otherwise be possible.

Butyl rubber, as is well known, is the type of synthetic rubber made by copolymerizing an isoolefin, usually isobutylene, with a minor proportion of a multi-olefinic unsaturate having from 4 to 14 carbon atoms per molecule. The isoolefins used generally have from 4 to 7 carbon atoms, and such isomonoolefins as isobutylene or ethyl methyl ethylene are preferred. The multi-olefinic unsaturate usually is an aliphatic conjugated diolefin having from 4 to 6 carbon atoms, and is preferably isoprene or butadiene. Other suitable diolefins that may be mentioned are such compounds as piperylene; 2,3-dimethyl butadiene-1,3; 1,2-dimethyl butadiene-1,3; 1,3-dimethyl butadiene-1,3; 1-ethyl butadiene-1,3; and 1,4-dimethyl butadiene-1,3. The Butyl rubber contains only relatively small amounts of copolymerized diene, typically from about 0.5 to 5%, and seldom more than 10%, on the total weight of the elastomer. For the sake of convenience and brevity, the various possible synthetic rubbers within this class will be designated generally by the term Butyl rubber.

The dimethylol phenols employed as curing agents in the process of the invention are known materials. The dimethylol phenol employed may be essentially a monomeric material, or it may be a polymeric material formed by self-condensation of the dimethylol phenol to yield a heat-reactive, oil-soluble, resinous product. Such resinous polymeric dimethylol phenols are the preferred materials for use in manufacturing the puncture-sealant from Butyl rubber in accordance with the method of the invention. Mixtures of the resinous polymeric dimethylol phenols with more or less of low molecular weight or monomeric dimethylol phenols are also useful. For convenience, the term dimethylol phenol will be used to refer to any of the monomeric or polymeric compounds, or to mixtures thereof, unless otherwise stated.

As will be understood by those skilled in the art, the dimethylol phenols are typically made by reacting a para-substituted phenol having the two ortho positions unoccupied, with a considerable molar excess of formaldehyde, the molar ratio of formaldehyde to phenol typically being 2:1, in the presence of a strong alkaline catalyst, especially an alkali metal hydroxide, which is subsequently neutralized. Typically the mixture of the phenol, formaldehyde and alkaline catalyst is heated at a suitable temperature, e. g., 25–100° C., the first stage of the reaction involving formation of the phenol methylol, i. e., the para-substituted-2,6-dimethylol phenol. This material, which is a phenol dialcohol, can be isolated by acidification of the mixture and separation of the oily layer which can then be advanced to higher molecular weight form by heating at say 75–175° C. This higher molecular weight form is oil-soluble and heat-reactive, and has the advantages that it is more reactive with the Butyl rubber than the lower molecular weight form. Separation of the phenol dialcohol can be omitted, in which case the reaction is carried past the monomer stage to the resinous stage, whereupon the mixture is neutralized and water is removed to give the resinous material. In any case, care should be taken to stop while the resin is in the soluble (in conventional organic solvents and drying oils) and fusible state. This is the resol type of resin.

The phenol from which the dimethylol phenol is made generally has a hydrocarbon group in the position para to the phenolic hydroxyl, examples being alkyl groups, especially alkyl groups having from 3 to 20 carbon atoms, tertiary-butyl and tertiary-octyl (alpha, alpha, gamma, gamma-tetramethyl butyl) being especially preferred, cycloalkyl groups, aryl groups such as phenyl, and aralkyl groups such as benzyl and cumyl. We believe that the tertiary-butyl and the aforementioned branched octyl are outstanding. Examples of suitable dimethylol phenols that may be used in the invention either in the polymeric or monomeric form are as follows:

2,6-dimethylol-4-methyl phenol
2,6-dimethylol-4-tertiary-butyl phenol
2,6-dimethylol-4-octyl phenol
2,6-dimethylol-4-dodecyl phenol
2,6-dimethylol-4-phenyl phenol
2,6-dimethylol-4-benzyl phenol
2,6-dimethylol-4-(alpha, alpha-dimethyl benzyl) phenol
2,6-dimethylol-4-cyclohexyl phenol The resinous forms of these materials, prepared as described, are preferred, especially when derived from the lower alkyls (8 carbon atoms or less). The dimethylol phenol is generally employed in amount within the range of from about 2 to 15 parts by weight to 100 parts of the Butyl rubber. While smaller amounts of the dimethylol phenol may be employed, e. g. 1 part, it is usually found that less than this amount is insufficient to produce a practical cure within a reasonable time. However, if actual substantial vulcanization is not desired, and a limited or partial reaction is all that is involved, very small amounts may be used, as will be more fully explained below. Also, larger amounts may be used, e. g., 20 parts, but amounts greater than this are without further advantage.

In accordance with a preferred embodiment of the invention, the Butyl rubber is compounded for vulcanization with a dimethylol phenol, using a chlorinated paraffin as an accelerator. The chlorinated paraffins are known materials, made by chlorination of paraffin waxes. They may be liquid, semi-fluid, or solid, depending upon the type of paraffin and the degree of chlorination. The amount of chlorine in chlorinated paraffins varies widely (e. g. 10–80%), and for purposes of the invention the chlorine content is not critical, but it may be stated that the chlorine content of the typical commercial grades of chlorinated paraffins is generally of the order of from 30% to 70%, with the solid products usually containing about 70% chlorine, and the liquid and semi-fluid products usually containing about 40-50% chlorine. The products marketed under such trade designations as "Clorafin," "Chloroparaffin," "Chlorowax," and are representative of the commercial chlorinated paraffins.

The amount of chlorinated paraffin employed in the invention may vary considerably, but usually only a very small amount is used, since the chlorinated paraffins are quite potent in their accelerating action. Thus, definite accelerating effect may be noted with as little as a few tenths of a part of the chlorinated paraffin in 100 parts of Butyl rubber, although we generally use somewhat more than this, say 3 to 10 parts per 100 parts of the Butyl. Although even larger amounts of the accelerator can be used, say 15 or 20 parts, it is not generally necessary or desirable to use appreciably more than about 10 parts.

We have further found that the accelerating effect of the chlorinated paraffins can be enhanced greatly by the presence of small amounts of heavy metal compounds, especially heavy metal oxides, or heavy metal salts. Thus, the oxides of iron, zinc, tin, lead, aluminum, manganese, or other heavy metals, or salts of such metals with organic or inorganic acids, such as carbonic acid, chromic acid, acetic acid, stearic acid, lauric acid, etc., can be used as activators of the chlorinated paraffin acceleration. For example, the addition of 1-10 parts of zinc oxide to the vulcanizable mix will further decrease the time or temperature necessary for adequate cure.

In carrying out the invention, the butyl rubber, dimethylol phenol, and chlorinated paraffin, and any additional desired ingredients, may be mixed together in any desired order according to the procedures ordinarily used in mixing rubber compounds, with the aid of the usual rubber mixing equipment, such as an internal mixer or roll mills. If a heavy metal compound is included in the mixture to enhance the accelerating effect of the chlorinated paraffin, sustained high temperatures should be avoided during the mixing operation, to prevent undesired premature reaction.

The vulcanizable mixture resulting from the foregoing ingredients may be fabricated into the desired form by the usual methods, such as calendering, extrusion, or molding, and subsequently vulcanized by heating, preferably while confined under pressure.

For the purpose of making such articles as curing bags or inner tubes, there is generally included in the mixture a quantity of a suitable reinforcing material, preferably carbon black. Although from at least about 20 to 100 parts by weight of carbon black may be employed per 100 parts of the butyl rubber, it is generally preferred to use from about 40 to 80 parts of black, and most preferably about 50 or 60 parts. Other conventional fillers, such as clay, zinc oxide, iron oxide, etc., may also be used. Other conventional compounding ingredients, such as processing aids, may be included in the mixture if desired.

The curing process of the invention is conveniently carried out at a temperature of 200° F. or more, and preferably at temperatures in excess of 300° F., for periods of time ranging from about 5 minutes to 3 hours, the longer periods of time within the stated time range being employed with the lower temperatures. The most preferred vulcanizing temperatures are within the range of about 320° to 370° F., although somewhat higher temperatures may be employed, e. g., 390° or 400° F., provided that such highly elevated temperatures are not maintained for a sufficiently long time to cause thermal injury to the article.

The following examples will serve to illustrate the invention in more detail. In the examples, the amounts of the various ingredients are all expressed in terms of parts by weight.

*Table I*

| | | I-1 | I-2 | I-3 | I-4 | I-5 | I-6 | I-7 | I-8 | I-9 |
|---|---|---|---|---|---|---|---|---|---|---|
| Ingredients: | | | | | | | | | | |
| GR-I 18 | | 100 | 100 | 100 | 100 | 100 | 100 | 100 | 100 | 100 |
| Clorafin 42 | | | 1 | 5 | 10 | | 1 | 5 | 10 | 5 |
| ST-137 Resin | | 12 | 12 | 12 | 12 | 12 | 12 | 12 | 12 | 12 |
| Philblack O (Carbon black) | | | | | | 60 | 60 | 60 | 60 | 60 |
| Zinc Oxide | | | | | | | | | | 3 |
| | Cure at 350° F. | | | | | | | | | |
| Properties: | | | | | | | | | | |
| Tensile Strength, p. s. i. | 5' | 17 | 81 | 14 | 105 | | | 800 | 690 | 1,000 |
| | 10' | 85 | 65 | 92 | 220 | 570 | 790 | 1,290 | 1,300 | 1,500 |
| | 15' | 255 | 200 | 118 | 100 | 1,390 | 1,170 | 1,660 | 1,140 | 1,820 |
| | 30' | 380 | 390 | 155 | 160 | 1,850 | 1,600 | 1,850 | 1,860 | 2,050 |
| | 45' | 430 | 270 | 125 | 120 | 1,990 | 1,670 | 1,860 | 1,960 | 2,000 |
| | 60' | 245 | 220 | 135 | 130 | 2,030 | 1,770 | 1,980 | 1,850 | 2,000 |
| Elongation at Break, percent | 5' | 1,100+ | 1,100+ | 1,100+ | 730 | | | 830 | 870 | 760 |
| | 10' | 1,100+ | 1,100+ | 1,000 | 830 | 770 | 690 | 750 | 820 | 680 |
| | 15' | 1,100+ | 1,100+ | 640 | 500 | 750 | 610 | 520 | 510 | 530 |
| | 30' | 930 | 800 | 590 | 550 | 550 | 470 | 480 | 530 | 440 |
| | 45' | 830 | 770 | 510 | 480 | 500 | 430 | 400 | 520 | 370 |
| | 60' | 680 | 650 | 510 | 490 | 440 | 360 | 410 | 470 | 350 |
| 300% Modulus, p. s. i. | 5' | 17 | 24 | 14 | 29 | | | 185 | 155 | 260 |
| | 10' | 12 | 18 | 37 | 41 | 275 | 260 | 385 | 295 | 450 |
| | 15' | 24 | 30 | 41 | 46 | 445 | 395 | 790 | 480 | 855 |
| | 30' | 31 | 42 | 49 | 44 | 1,000 | 895 | 1,030 | 810 | 1,320 |
| | 45' | 43 | 52 | 50 | 72 | 1,130 | 1,190 | 1,150 | 960 | 1,650 |
| | 60' | 49 | 50 | 55 | 61 | 1,450 | 1,430 | 1,350 | 1,000 | 1,820 |
| 500% Modulus | 5' | 17 | 24 | 14 | 29 | | | 410 | 375 | 800 |
| | 10' | 12 | 18 | 37 | 53 | 535 | 560 | 525 | 725 | 1,050 |
| | 15' | 24 | 40 | 53 | 100 | 940 | 925 | 1,600 | 1,130 | 1,770 |
| | 30' | 62 | 54 | 110 | 89 | 1,730 | | | 1,630 | |
| | 45' | 62 | 104 | 125 | | 1,990 | | | 1,900 | |
| | 60' | 105 | 110 | 130 | | | | | | |
| Hardness, Shore A | 5' | 27 | 27 | 27 | 23 | 58 | 53 | 53 | 50 | 53 |
| | 10' | 28 | 28 | 27 | 23 | 58 | 55 | 55 | 50 | 59 |
| | 15' | 28 | 28 | 28 | 23 | 60 | 60 | 57 | 51 | 61 |
| | 30' | 28 | 28 | 28 | 23 | 62 | 62 | 60 | 55 | 65 |
| | 45' | 28 | 28 | 28 | 23 | 65 | 64 | 62 | 56 | 65 |
| | 60' | 29 | 28 | 28 | 23 | 66 | 64 | 62 | 57 | 65 |
| Percent Volume Increase in Cyclohexane in 120 hrs. at 75° F. | 5' | (¹) | (¹) | 4,148 | 728 | (²) | (²) | 659 | 645 | 635 |
| | 10' | 3,154 | 2,260 | 928 | 608 | 709 | 657 | 582 | 499 | 452 |
| | 15' | 1,084 | 1,007 | 581 | 539 | 535 | 467 | 322 | 399 | 306 |
| | 30' | 693 | 663 | 558 | 548 | 336 | 320 | 286 | 317 | 248 |
| | 45' | 614 | 564 | 531 | 504 | 287 | 261 | 257 | 286 | 216 |
| | 60' | 584 | 564 | 511 | 508 | 254 | 249 | 252 | 272 | 215 |
| Williams Plasticity Number at 212° F. | 5' | 344 | 348 | 455 | 839 | | | | | |
| | 10' | 558 | 563 | 762 | 891 | | | | | |
| | 15' | 752 | 759 | 908 | 927 | | | | | |
| | 30' | 895 | 915 | 964 | 973 | | | | | |
| | 45' | 929 | 944 | 975 | 975 | | | | | |
| | 60' | 940 | 947 | 984 | 983 | | | | | |

¹ Samples dissolved.
² Swollen to rupture and unfit for test.

EXAMPLE I

Nine separate stocks were made up by mixing on a mill the materials shown in Table I in the stated amounts. Portions of the stocks were cured for varying times as indicated, and the properties of the resulting vulcanizates were measured, with the results noted in the table. The GR-I 18 is a commercial grade of synthetic rubber made by copolymerizing isobutylene and isoprene, and containing about 2½% of combined isoprene. The Clorafin 42 is a commercial chlorinated paraffin having the form of a viscous liquid and containing about 42% chlorine. The Amberol ST-137 is a commercial phenolic resin of the dimethylol phenol class, and it is believed to be made from about 1 mole of p-octyl phenol, 2 moles of formaldehyde and 1 mole of sodium hydroxide, the alkali being carefully neutralized after the condensation is complete.

In stocks I-1 to I-4 of Table I no carbon black is present. Stock I-I is a control containing no Clorafin 42, and stocks I-2 to I-4 contain increasing quantities of Clorafin 42. Stocks I-5 to I-9 contain carbon black.

Stock I-5 is a control and stocks I-6 to I-8 contain increasing amounts of Clorafin 42, while stock I-9 further includes zinc oxide. Perhaps the most significant results shown in Table I are the figures on the amount of swelling of the cured stocks in cyclohexane. Such equilibrium swell data is recognized as one of the most accurate methods of defining the amount of cross-linkage in Butyl. The results clearly indicate the accelerating effect of Clorafin 42, and the greater accelerating effect of Clorafin 42 plus zinc oxide. By comparison, typical sulfur cures of Butyl may require 6-22 minutes cure at 350° F. to attain minimum swell values of 430-500%.

In the resin cured gum Butyl compounds the tensile and modulus characteristics are low, and such tests are therefore inadequate for defining differences in states of cure. The Williams plasticities, however, are quite satisfactory for this task.

EXAMPLE II

To determine the antioxidant characteristics of the vulcanizates of the invention, stocks I-5, I-7 and I-9 of Example I were subjected to an aging test. The stocks were first pre-cured in a slab mold. Stock I-5 was cured for 60 minutes at 350° F., while stocks I-7 and I-9 were cured only for 15 minutes, in order to demonstrate that the antioxidant effect was not due to a higher state of cure in the accelerated stock. The pre-cured stocks were then heated to a temperature of 350° F. in an air pressure cure mold, having metal on one surface and air on the other, for a period of 16 hours under a pressure of 100 pounds per square inch. This test was severe enough to completely degrade a standard stock. The results of the test are indicated in Table II.

*Table II*

ANTIOXIDANT TEST

|  | Original | | | Aged | | | Percent Original | | |
| --- | --- | --- | --- | --- | --- | --- | --- | --- | --- |
| Stock | I-5 | I-7 | I-9 | I-5 | I-7 | I-9 | I-5 | I-7 | I-9 |
| Physical Properties: | | | | | | | | | |
| Tensile | 2,030 | 1,660 | 1,820 | 125 | 160 | 1,200 | 6.15 | 9.65 | 66 |
| Elongation | 440 | 520 | 530 | 440 | 500 | 270 | 100 | 96 | 51 |
| 300% Modulus | 1,450 | 790 | 855 | 105 | 115 | | | | |

The data of Table II indicate that stock I-9, containing Clorafin 42 plus zinc oxide, is remarkably resistant to oxidation, compared to stock I-7 containing Clorafin 42 but no zinc oxide, as well as compared to the control stock I-5 containing no Clorafin 42.

EXAMPLE III

This example further illustrates the activation of the chlorinated paraffin acceleration by means of combined heavy metals. The stocks shown in the table were hot milled for 5 minutes at 225° F. to disperse the resin. In the case of stock III-7, the zinc acetate was added as an aqueous solution prior to addition of the resin, and the stock was milled for 15 minutes at 235° F. to eliminate water, after which the Clorafin 42 and the resin were added to complete the mix.

*Table III*

| | | III-1 | III-2 | III-3 | III-4 | III-5 | III-6 | III-7 | III-8 |
| --- | --- | --- | --- | --- | --- | --- | --- | --- | --- |
| Ingredients: | | | | | | | | | |
| GR-I 18 | | 100 | 100 | 100 | 100 | 100 | 100 | 100 | 100 |
| EPC Carbon Black | | 60 | 60 | 60 | 60 | 60 | 60 | 60 | 60 |
| Stearic Acid | | 1 | 1 | 1 | 1 | 1 | 1 | 1 | 1 |
| ST-137 Resin | | 12 | 12 | 12 | 12 | 12 | 12 | 12 | 12 |
| Clorafin 42 | | 10 | 10 | 10 | 10 | 10 | 10 | 10 | 10 |
| Zinc Oxide | | | 5 | | | | | | |
| Zinc Chromate | | | | | 5 | | | | |
| Zinc Carbonate | | | | | | 5 | | | |
| Zinc Stearate | | | | | | | 5 | | |
| Zinc Laurate | | | | | | | | 5 | |
| Zinc Acetate | | | | | | | | 5 | |
| Black Iron Oxide | | | | | | | | | 5 |
| Properties: | Cured at 350° F. | | | | | | | | |
| Tensile | 5' | 1,055 | 2,320 | 1,890 | 1,940 | 2,130 | 1,930 | 1,820 | 2,260 |
| | 10' | 1,480 | 2,560 | 2,160 | 2,290 | 2,080 | 2,320 | 1,860 | 2,540 |
| | 15' | 1,725 | 2,490 | 2,290 | 2,320 | 2,240 | 2,190 | 2,340 | 2,460 |
| | 30' | 1,945 | 2,480 | 2,330 | 2,330 | 2,180 | 2,080 | 2,050 | 2,350 |
| | 45' | 2,045 | 2,460 | 2,260 | 2,390 | 2,030 | 2,000 | 1,890 | 2,390 |
| | 60' | 2,060 | 2,510 | 2,280 | 2,510 | 2,080 | 2,020 | 1,740 | 2,240 |
| Elongation | 5' | 910 | 700 | 770 | 610 | 650 | 650 | 830 | 580 |
| | 10' | 780 | 540 | 680 | 530 | 340 | 390 | 480 | 440 |
| | 15' | 720 | 460 | 640 | 430 | 360 | 340 | 440 | 360 |
| | 30' | 650 | 390 | 550 | 360 | 330 | 320 | 420 | 330 |
| | 45' | 610 | 300 | 480 | 350 | 310 | 310 | 430 | 320 |
| | 60' | 550 | 370 | 450 | 360 | 330 | 330 | 450 | 280 |
| 300% Modulus | 5' | 180 | 690 | 475 | 640 | 720 | 510 | 380 | 945 |
| | 10' | 330 | 1,240 | 685 | 1,070 | 1,760 | 1,650 | 945 | 1,540 |
| | 15' | 420 | 1,350 | 760 | 1,415 | 1,910 | 1,880 | 1,420 | 1,870 |
| | 30' | 585 | 1,830 | 1,090 | 1,860 | 1,990 | 1,990 | 1,310 | 2,240 |
| | 45' | 690 | 1,835 | 1,215 | 2,000 | 2,000 | 1,910 | 1,220 | 1,990 |
| | 60' | 795 | 1,945 | 1,280 | 2,060 | 1,990 | 1,910 | 1,085 | |

Table III.—Continued

|  |  | III-1 | III-2 | III-3 | III-4 | III-5 | III-6 | III-7 | III-8 |
|---|---|---|---|---|---|---|---|---|---|
| 500% Modulus | 5' | 440 | 1,650 | 1,135 | 1,495 | 1,730 | 1,330 | 905 | 1,970 |
|  | 10' | 820 | 2,420 | 1,580 | 2,230 |  |  |  |  |
|  | 15' | 1,050 |  | 1,775 |  |  |  |  |  |
|  | 30' | 1,450 |  |  | 2,230 |  |  |  |  |
|  | 45' | 1,710 |  |  |  |  |  |  |  |
|  | 60' | 1,905 |  |  |  |  |  |  |  |
| Hardness | 5' | 46 | 53 | 54 | 53 | 55 | 52 | 50 | 53 |
|  | 10' | 50 | 60 | 58 | 60 | 67 | 63 | 57 | 60 |
|  | 15' | 51 | 62 | 60 | 64 | 69 | 66 | 69 | 63 |
|  | 30' | 55 | 64 | 65 | 67 | 69 | 69 | 73 | 67 |
|  | 45' | 59 | 66 | 67 | 69 | 71 | 70 | 74 | 68 |
|  | 60' | 59 | 68 | 68 | 69 | 71 | 71 | 74 | 69 |
| Hot Flow:ᴬ |  |  |  |  |  |  |  |  |  |
| 6 Hrs | 15' | 63 | 9.8 | 18.2 | 9.8 | 5.1 | 2.6 | 7.5 | 0 |
|  | 30' | 36 | 4.9 | 14 | 10 | 0 | 2.5 | 7.7 | 2.4 |
| 24 Hrs | 15' | 106 | 9.8 | 22 | 12.2 | 5.1 | 2.6 | 7.5 | 2.4 |
|  | 30' | 65 | 7.3 | 14 | 12.5 | 2.4 | 5 | 10.3 | 2.4 |
| 48 Hrs | 15' |  | 12.2 | 23 | 14.6 | 5.1 | 4.9 | 10 | 2.4 |
|  | 30' |  | 9.8 | 16.3 | 12.5 | 2.4 | 5 | 10.3 | 2.4 |

ᴬ Percent elongation under an original stress of 50 p. s. i. applied at a temperature of 340° F. for the times indicated.

EXAMPLE IV

In this example the invention is further illustrated, using Clorafin 42 in one stock, and using Clorafin 42S in the other stock. Clorafin 42S is similar to Clorafin 42, but is stabilized for better clarity and color.

Table IV

|  |  | IV-1 | IV-2 |
|---|---|---|---|
| Ingredients: |  |  |  |
| GR-I 18 |  | 100 | 100 |
| EPC Carbon Black |  | 60 | 60 |
| Stearic Acid |  | 1 | 1 |
| Clorafin 42 |  | 10 |  |
| Clorafin 42S |  |  | 10 |
| Zinc Laurate |  | 5 | 5 |
| ST-137 Resin |  | 12 | 12 |
| Properties: | at 350° F. |  |  |
| Tensile | 5' | 1,780 | 1,880 |
|  | 10' | 2,240 | 2,110 |
|  | 15' | 2,190 | 2,170 |
|  | 30' | 2,100 | 2,110 |
|  | 45' | 2,050 | 2,040 |
|  | 60' | 2,040 | 1,990 |
| Elongation | 5' | 860 | 670 |
|  | 10' | 450 | 350 |
|  | 15' | 340 | 350 |
|  | 30' | 320 | 350 |
|  | 45' | 330 | 340 |
|  | 60' | 330 | 340 |
| 300% Modulus | 5' | 295 | 490 |
|  | 10' | 1,285 | 1,740 |
|  | 15' | 1,910 | 1,850 |
|  | 30' | 1,870 | 1,700 |
|  | 45' | 1,850 | 1,800 |
|  | 60' | 1,930 | 1,750 |
| 500% Modulus | 5' | 840 | 1,300 |
| Hardness (Shore A) | 5' | 54 | 53 |
|  | 10' | 63 | 65 |
|  | 15' | 65 | 67 |
|  | 30' | 69 | 68 |
|  | 45' | 71 | 70 |
|  | 60' | 73 | 70 |
| Mooney Plasticity | 60' | 69 | 67 |
| Hot Flow:* |  |  |  |
| 6 Hrs | 15' | 2.4 | 0 |
|  | 30' | 0 | 0 |
| 24 Hrs | 15' | 2.4 | 0 |
|  | 30' | 2.4 | 2.4 |
| 48 Hrs | 15' | 4.7 | 2.4 |
|  | 30' | 2.4 | 2.4 |

*50 p. s. i. at 340° F.

From the foregoing it will be apparent that the invention provides an effective and efficient means for accelerating the cure of Butyl rubber with dimethylol phenols. Using chlorinated paraffin wax as accelerator, it is possible to obtain a fast cure. It is also possible to reduce the amount of dimethylol phenol necessary for a good cure. The vulcanizates with reduced dimethylol phenol levels are definitely competitive from an economic standpoint with the usual sulfur cures. Hence, advantage can be taken of the superior ability of the dimethylol phenol vulcanizates to resist heat, without added cost. The invention therefore provides economical vulcanizates having increased service life, especially in applications where the vulcanizate is exposed to the influence of steam or oxygen. The dimethylol phenol cured products also have the advantage that "bloom" can be avoided, because of the absence of sulfur curatives.

The improved vulcanizates of the invention can be used to great advantage in making a variety of useful articles, such as curing bags, curing blankets, or curing domes of the various known kinds, either for new tires or for retreading tires, as well as in making hose, belts, inner tubes, especially heavy service inner tubes, and pneumatic tires, especially tire treads and side walls, as well as other objects.

The process of the invention has been described with particular reference to the use of chlorinated paraffin wax to accelerate the dimethylol phenol cure of Butyl rubber, wherein it was desired to substantially completely cure the Butyl rubber. However, it will be understood that the accelerating effect of the chlorinated paraffin on the reaction between the dimethylol phenol and Butyl rubber can be taken advantage of also in processes where only a limited or partial chemical modification of the Butyl rubber by the dimethylol phenol takes place. In such cases, the limited or partial reaction can be carried out in a shorter time, or at a lower temperature, by using the chlorinated paraffin as accelerator in accordance with the invention. Thus, for example, the partial reaction between Butyl rubber and limited amounts of dimethylol phenol, for example, 0.2 to 2.5 parts per 100 parts of Butyl rubber, carried out at temperatures of 200°–400° F. for from 5 to 45 minutes, can be effectively accelerated by the presence of a small amount of chlorinated paraffin as described. Butyl rubber partially reacted with dimethylol phenol and the process of making the same are disclosed in more detail and claimed in copending application Serial No. 290,344, filed May 27, 1952 now U. S. Patent 2,702,287.

Having thus described our invention, what we claim and desire to protect by Letters Patent is:

1. In the method of chemically modifying a rubbery copolymer of an isoolefin having from 4 to 7 carbon atoms with from 0.5 to 10% of an aliphatic conjugated diolefin having from 4 to 6 carbon atoms by heating 100 parts of said rubber at a temperature of from 200° to 400° F. for from 5 minutes to 3 hours in admixture with from 0.2 to 20 parts of a 2,6-dimethylol-4-hydrocarbon phenol wherein said hydrocarbon is a radical selected from the group consisting of alkyl having from 1 to 20 carbon atoms, cycloalkyl, aryl and aralkyl radicals, the improvement which comprises the step of carrying out the said modification in the presence of from a few tenths of a part to 20 parts of chlorinated paraffin wax to accelerate the said modification reaction.

2. A method as in claim 1 in which the said 2,6-dimethylol-4-hydrocarbon phenol is an oil-soluble, heat-reactive resol resin.

3. A method as in claim 2 in which the said modification is carried out in the presence of at least one part of a heavy metal compound selected from the group consisting of heavy metal oxides and heavy metal salts to activate the said accelerator.

4. A method of vulcanizing a rubbery copolymer of an isoolefin having from 4 to 7 carbon atoms with from 0.5 to 10% of an aliphatic conjugated diolefin having from 4 to 6 carbon atoms comprising the step of heating 100 parts of the said rubber at a temperature of from 200° to 400° F. for from 5 minutes to 3 hours in admixture with from 1 to 20 parts of a 2,6-dimethylol-4-hydrocarbon phenol wherein said hydrocarbon is a radical selected from the group consisting of alkyl having from 1 to 20 carbon atoms, cycloalkyl, aryl and aralkyl radicals, and from a few tenths of a part to 20 parts of chlorinated paraffin wax to accelerate the said vulcanization.

5. A method of vulcanizing a rubbery copolymer of isobutylene with from 0.5 to 5% of isoprene comprising the step of heating 100 parts of the said rubber at a temperature of from 200° to 400° F. for from 5 minutes to 3 hours in admixture with from 2 to 15 parts of an oil-soluble, heat-reactive resol resin which is a 2,6-dimethylol-4-hydrocarbon phenol wherein said hydrocarbon is a radical selected from the group consisting of alkyl having from 1 to 20 carbon atoms, cycloalkyl, aryl and aralkyl radicals, and from 3 to 10 parts of chlorinated paraffin wax to accelerate the said vulcanization.

6. A method as in claim 5 in which the said hydrocarbon radical is a lower alkyl group.

7. A method as in claim 6 in which the said lower alkyl group is tertiary butyl.

8. A method as in claim 6 in which the said lower alkyl group is octyl.

9. A method as in claim 5 in which the said vulcanization is carried out in the presence of a heavy metal compound selected from the group consisting of heavy metal oxides and heavy metal salts, in amount sufficient to activate the said accelerator.

10. A method as in claim 9 in which the said lower alkyl group is tertiary butyl.

11. A method as in claim 9 in which the said lower alkyl group is octyl.

12. A method as in claim 9 in which the said lower alkyl group is octyl and the said heavy metal compound is zinc oxide.

13. A method as in claim 9 in which the said lower alkyl group is octyl and the said heavy metal compound is a zinc salt of a fatty acid.

14. A method as in claim 9 in which the said lower alkyl group is octyl and the said heavy metal compound is iron oxide.

15. A vulcanizate characterized by improved resistance to aging comprising 100 parts of a rubbery copolymer of an isoolefin having from 4 to 7 carbon atoms with from 0.5 to 10% of an aliphatic conjugated diolefin having from 4 to 6 carbon atoms vulcanized with from 1 to 20 parts of an oil-soluble, heat-reactive resol resin which is a 2,6-dimethylol-4-hydrocarbon phenol wherein the hydrocarbon radical is selected from the group consisting of alkyl having from 1 to 20 carbon atoms, cycloalkyl, aryl and aralkyl, in amount of from 1 to 20 parts, and accelerated with from 3 to 20 parts of chlorinated paraffin wax.

16. A vulcanizate as in claim 15 in which the hydrocarbon radical is a lower alkyl group.

17. A vulcanizate as in claim 16 in which the alkyl group is octyl.

References Cited in the file of this patent

UNITED STATES PATENTS 2,545,977    Smith _____ Mar. 20, 1951

OTHER REFERENCES

Ser. No. 357,662, Wildschut (A. P. C.), published Apr. 20, 1943, now abandoned.

Industrial and Engineering Chemistry, vol. 41, No. 3, March, 1949, pages 592–596.